United States Patent [19]

Buchmann et al.

[11] 4,400,116
[45] Aug. 23, 1983

[54] CUTTING TOOL WITH ADJUSTABLE CHIP BREAKER

[75] Inventors: Kurt Buchmann, Essen; Heinrich Eigen, Mülheim-Ruhr; Norbert Reiter, Mettmann, all of Fed. Rep. of Germany

[73] Assignee: Fried. Krupp Gesellschaft mit beschränkter Haftung, Essen, Fed. Rep. of Germany

[21] Appl. No.: 228,238

[22] Filed: Jan. 26, 1981

[30] Foreign Application Priority Data

Jan. 26, 1980 [DE] Fed. Rep. of Germany ....... 3002854

[51] Int. Cl.³ .............................................. B26D 1/00
[52] U.S. Cl. .......................................... 407/3; 407/5; 407/100; 407/109
[58] Field of Search ................... 407/2, 3, 4, 5, 6, 100, 407/91, 109

[56] References Cited

U.S. PATENT DOCUMENTS

| | | | |
|---|---|---|---|
| 2,912,744 | 11/1959 | Proksa | 407/3 |
| 3,191,262 | 6/1965 | Gustafson | 407/5 |
| 3,216,086 | 11/1965 | Kryszek | 407/4 |
| 3,331,116 | 7/1967 | Füssenhäuser et al. | 407/5 |
| 3,500,523 | 3/1970 | Cashman et al. | 407/5 |

FOREIGN PATENT DOCUMENTS

| | | |
|---|---|---|
| 970903 | 9/1964 | United Kingdom . |
| 1017301 | 1/1966 | United Kingdom . |
| 1095261 | 12/1967 | United Kingdom . |
| 1171868 | 11/1969 | United Kingdom . |
| 1227315 | 4/1971 | United Kingdom . |
| 1353127 | 5/1974 | United Kingdom . |
| 2067934 | 8/1981 | United Kingdom ............ 407/5 |

*Primary Examiner*—Leonidas Vlachos
*Attorney, Agent, or Firm*—Spencer & Kaye

[57] ABSTRACT

A cutting tool which includes a mounting shaft and a chip breaker positioned on the mounting shaft. A cutting plate is supported between the mounting shaft and the chip breaker, with a clamping jaw being positioned on the chip breaker. A clamping screw is releasably held in the cutting tool mounting shaft for holding the clamping jaw and the chip breaker against the tool mounting shaft. The clamping screw has a longitudinal axis and an outer portion which is situated externally of the clamping jaw. A spring is provided for urging the chip breaker against the clamping jaw. The clamping jaw and the chip breaker have interengaging teeth on their surfaces which are oriented towards one another. The chip breaker further includes a throughgoing aperture through which the clamping screw passes. The throughgoing aperture is enlarged to form an elongated opening for permitting lateral movement of the chip breaker transversely to the longitudinal axis of the clamping screw.

19 Claims, 4 Drawing Figures

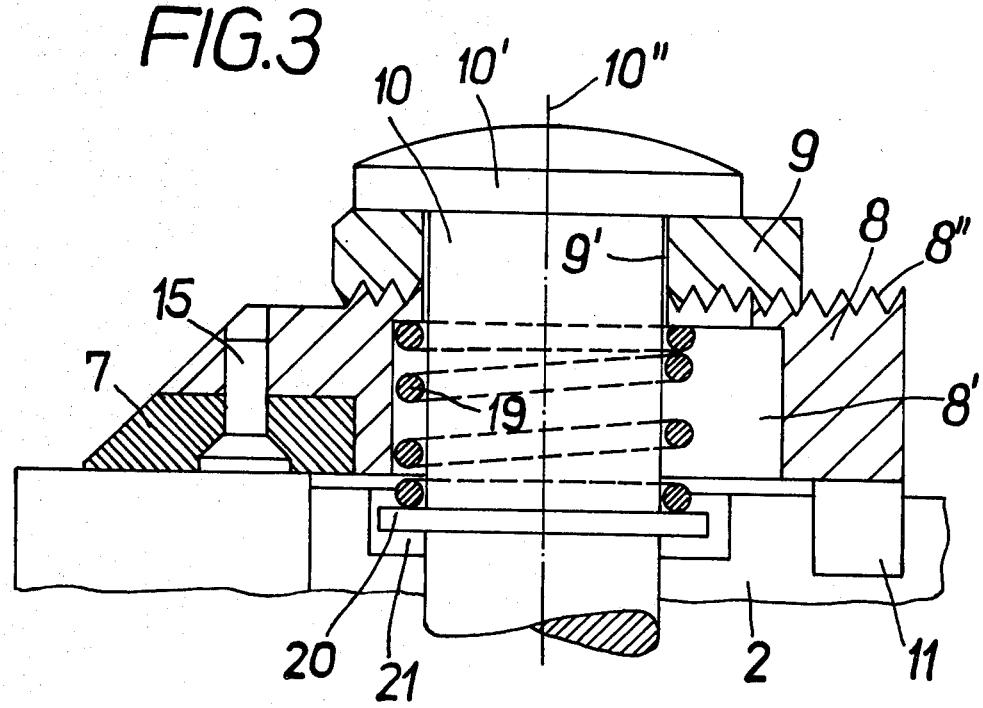
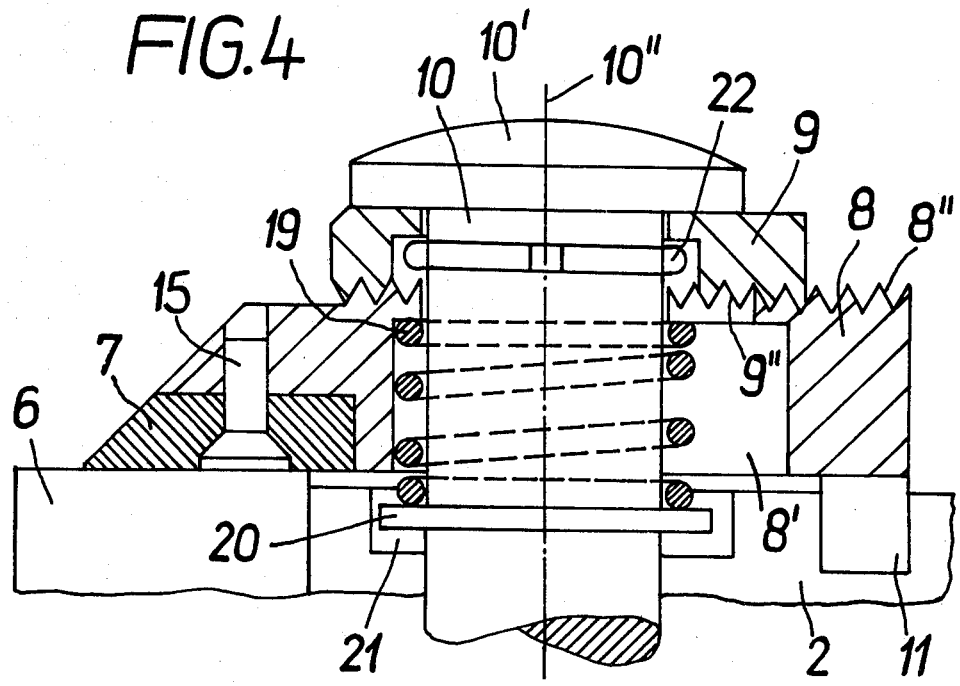

CUTTING TOOL WITH ADJUSTABLE CHIP BREAKER

BACKGROUND OF THE INVENTION

The present invention relates to a cutting tool having an adjustable chip breaker, an exchangeable cutting plate supported on the chip breaker and on a mounting shaft of the cutting tool, and a clamping jaw which lies on the chip breaker and which is releasably connected to the cutting tool mounting shaft by a clamping screw member. The adjustable chip breaker is held in contact with the clamping jaw by a spring element which engages the chip breaker. The latter is provided with teeth on which the clamping jaw is supported.

In a cutting tool disclosed in German Offenlegungsschrift (Laid-Open Application) No. 1,477,328, a clamping jaw includes, in addition to an actual clamping component, a cylindrical guide member of substantial length which protrudes into a guide bore in a mounting shaft. The guide member is additionally provided with ribs to prevent undesirable rotation of the clamping jaw relative to the mounting shaft. The ribs also support a U-shaped bar whose end sections are positioned on both sides of the guide member to support a chip breaker. The chip breaker terminates in front of the clamping jaw guide member (as viewed from the front side of the cutting tool) and is provided on its surface with a plurality of extensively curved grooves. The clamping jaw is supported in one of these grooves by a tongue-shaped portion and is fastened in the mounting shaft by a clamping screw.

The above-described cutting tool has several drawbacks. Due to the cylindrical guide member and its ribs, which also serve to support the U-shaped bar, the tool is structurally very complicated and therefore expensive. Moreover, there exists the danger that the chip breaker, which is connected to the bar by a relatively short section, can become disengaged from the bar when the width of the chip breaker groove is changed, that is, when the chip breaker is moved relative to the clamping jaw. The absence of an accurate guidance and securement of the chip breaker has been found to have a particularly disadvantageous effect in case the cutting tool assumes a position other than that shown in the above German reference (in which the chip breaker is situated underneath the clamping jaw).

SUMMARY OF THE INVENTION

It is an object of the present invention to develop a cutting tool which, despite its simple design, permits exchange of the cutting plate without the need for resetting each time the width of the chip breaker groove. It is a further object of the invention to so design the cutting tool that the width of the chip breaker groove can be varied with precision and without difficulty.

These objects and others to become apparent as the specification progresses are achieved by the invention, according to which, briefly stated, the clamping jaw and chip breaker of the cutting tool are provided with interengaging teeth on their surfaces which are oriented towards one another. In addition, the chip breaker of the cutting tool includes a throughgoing aperture through which the cutting tool clamping screw passes. The throughgoing aperture is enlarged to form an elongated opening for permitting lateral movement of the chip breaker transversely to the longitudinal axis of the cutting tool clamping screw. Moreover, a spring element is provided to urge the chip breaker against the clamping jaw.

Thus, the novel features of the present invention include providing both the chip breaker and the clamping jaw with meshing teeth, providing the chip breaker with an elongated opening in the area of the clamping screw to permit longitudinal displacement of the chip breaker and providing a particularly structured and arranged spring element for supporting the chip breaker.

While cutting tools are also known which have an adjustable chip breaker with a longitudinal opening in the zone of the clamping screw, the adjustment of the chip breaker, particularly with respect to the mounting shaft and the cutting plate supported thereon, is effected by rotating the clamping jaw. The latter is designed as an eccentric disc which projects into the chip breaker and which is supported at the head of the clamping screw by a biased helical spring. These prior art tools, however, cannot be compared with the cutting tool of the present invention because of the different structure and function of the clamping jaw and the helical spring. Moreover, these prior art tools have additional deficiencies in that when their clamping screws are released, unintentional changes may occur in their pre-set chip breaker groove widths despite the use of helical springs.

In addition to the above distinctions relative to the prior art tools, the cutting tool of the present invention has simple geometric components, including a simple clamping screw, which can be easily produced.

According to a further feature of the invention, the clamping jaw which lies exclusively above the chip breaker has a plate-like configuration. Further, the spring element which is preferably a helical spring, may be a compression spring or a tension spring and is connected, accordingly, either to the clamping jaw, to the mounting shaft, or to the clamping screw.

In a preferred embodiment of the invention, the clamping jaw is relatively rotatably coupled with the clamping screw and is only slightly, if at all, displaceable in the direction of the longitudinal axis of the clamping screw. This arrangement has the advantage that the chip breaker can thus be easily moved from the teeth of the clamping jaw in order to be shifted into another position relative to the clamping jaw.

BRIEF DESCRIPTION OF THE DRAWINGS

FIGS. 1 through 4 are sectional elevational views of four preferred embodiments of the invention.

DESCRIPTION OF THE PREFERRED EMBODIMENT

Figure 1:
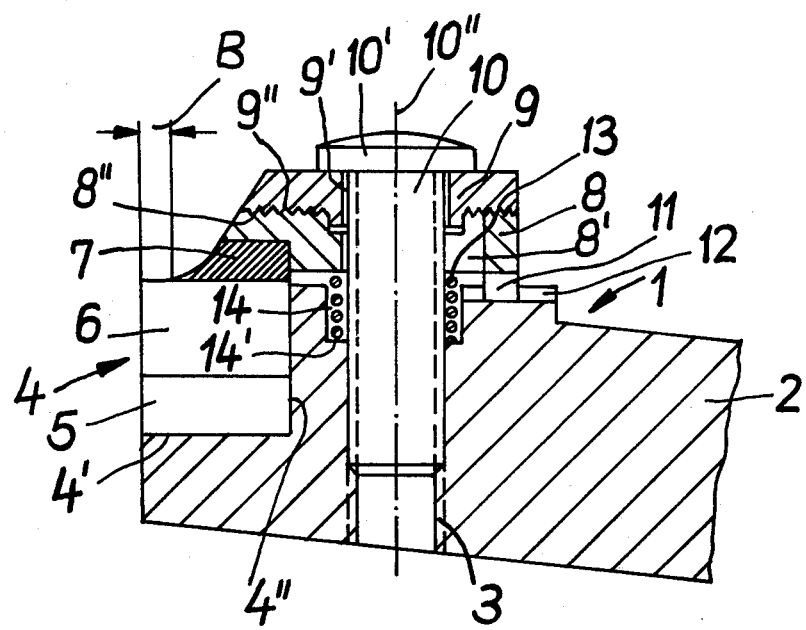

As seen in FIG. 1, the novel tool 1 of the present invention includes a mounting shaft 2 having a threaded bore 3 and a recess 4 with visible contact faces 4' and 4". The recess 4 accommodates both a backup plate 5 and a cutting plate 6, the latter resting on the backup plate 5. A sink screw (not shown) is used to fasten the backup plate 5 in recess 4. The cutting plate 6 may be made of any desired material, particularly of a ceramic material.

A chip breaker plate 7, releasably connected to a chip breaker 8, is supported on the cutting plate 6. A plate-shaped clamping jaw 9 is positioned on the chip breaker 8 and is clamped to the tool mounting shaft 2 and to the chip breaker 8 by means of a clamping screw 10. The latter has a head 10' engaging the top face of the clamping jaw 9, as well as a longitudinal axis 10". The clamping jaw 9 is provided with a through bore 9' of a diameter slightly larger than the outer diameter of the clamping screw 10. The chip breaker 8 is provided with an elongated opening 8' which permits a certain amount of longitudinal displacement of the chip breaker 8 (and thus of chip breaker plate 7) relative to the mounting shaft 2 and the cutting plate 6.

On their mutually facing surfaces, the clamping jaw 9 and the chip breaker 8 are provided with respective meshing teeth 9'' and 8'', having a pitch of preferably 1 mm. These teeth have two basic functions: (1) to assure a secure positioning of the chip breaker 8 and the chip breaker plate 7 with respect to the clamping jaw 9; and (2) to permit a fine adjustment of the width B of the chip breaker groove by moving the chip breaker 8 relative to the clamping jaw 9 through a predetermined number of teeth.

In order to prevent undesirable rotation of the interlocking components 8 and 9 with respect to the mounting shaft 2 and the cutting plate 6, the chip breaker 8 is provided, on its face oriented towards the chip breaker plate 7, with a guide pin 11 which engages in a guide groove 12 in the mounting shaft 2.

The chip breaker is supported on a cylindrical helical spring 13 which is seated on an annular base 14' of a bore 14 of the mounting shaft 2 and which loosely surrounds the clamping screw 10. Subsequent to loosening the tightening screw 10 and removing the cutting plate 6, the chip breaker 8 may be released from the teeth of the clamping jaw 9 by depressing the chip breaker 8 against the force of the spring 13. Then the chip breaker 8 may be shifted laterally relative to the clamping jaw 9, whereby a change in the width B of the chip breaker groove is effected.

Figure 2:
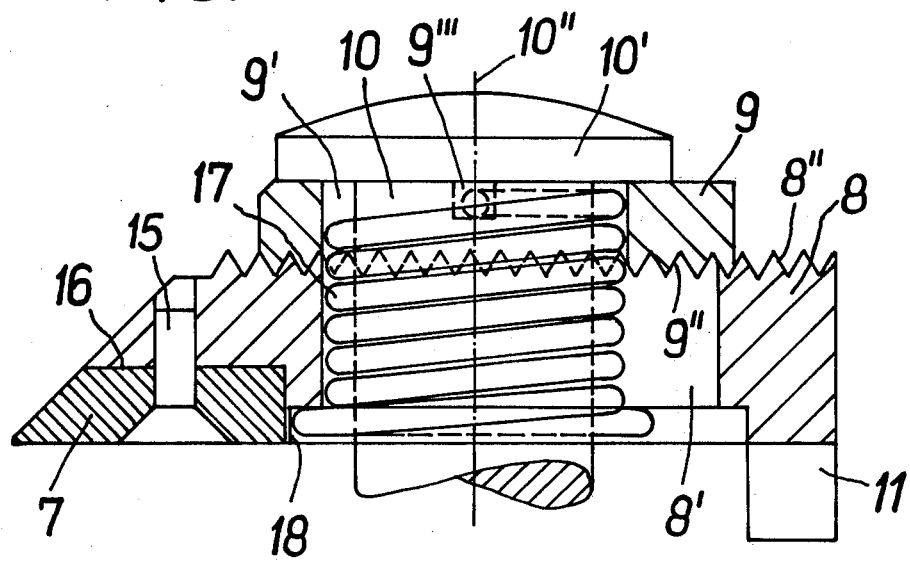

In the modified embodiment shown in FIG. 2, the chip breaker plate 7 is releasably fastened in a recess 16 of the chip breaker 8 by a grooved drive stud 15. The clamping screw 10 is surrounded by a tensioned helical spring 17, which is supported at one end by a step 18 on the chip breaker 8 and on the other end by a recess 9''' in clamping jaw 9. The components 8 and 9 are thus pressed against one another by means of the tension exerted by the helical spring 17. The clamping jaw 9 is a simple plate which is positioned exclusively above the chip breaker 8.

A further modification of the cutting tool of the present invention is shown in FIG. 3, where the spring element is a compressed helical spring 19, which is supported at one end within the elongated opening 8' on chip breaker 8 and on the other end by an abutment 20 on the clamping screw 10. In the illustrated embodiment, the abutment 20 is a standard-sized washer which is inserted on the clamping screw 10 outside the threaded area thereof. In order to accommodate abutment 20, the mounting shaft 2 is provided with a relatively short bore 21.

For preventing the clamping jaw 9 from remaining attached to the chip breaker 8 when the width B of the chip breaker groove is changed (as described with reference to FIG. 1), it is advisable to connect the clamping jaw 9 with the clamping screw 10 in such a manner that the clamping jaw 9 is rotatable with respect to the clamping screw 10, but is essentially immovable in the axial direction of the clamping screw 10. For this purpose the clamping screw 10 is provided with a fastening element underneath the screw head 10' so as to rotatably support the component 9.

In the further embodiment shown in FIG. 4, the fastening element is a standard-sized retaining ring 22 which is inserted on the clamping screw 10. Otherwise, the embodiment of FIG. 4 is identical to that of FIG. 3.

The fastening element for the clamping jaw 9, as well as the abutment for the helical string 19, may be designed in other ways. For example, the two components 20 and 22 may be replaced by a holding ring which is provided with fastening screws and which is pushed over the clamping screw 10 from the threaded side.

In the illustrated embodiments, the elongated opening 8' is designed to have a displacement range in the order of 5 mm. It is an essential feature of the invention that the chip breaker 8 is, independently from its position relative to the cutting plate 6, in engagement with the spring means in the vicinity of the clamping screw 10. This means, that the spring should be formed and positioned in a way to be always near to the clamping screw.

If the spring means—as in the case of the shown preferred embodiments—is a cylindrical helical spring (13 or 19), the latter closely surrounds the clamping screw 10 supporting the chip breaker 8 at any event in the vicinity of the clamping screw body.

As shown in FIGS. 2, 3 and 4, the clamping jaw 9 is plate-shaped and positioned exclusively on the chip breaker 8. This means that the clamping jaw has no sections projecting into the elongated opening 8' of member 8 and therefore can be easily and cheaply produced.

It is to be understood that the above description of the present invention is susceptible to various modifications, changes, and adaptations, and the same are intended to be comprehended within the meaning and range of equivalents of the appended claims.

What is claimed is:

1. A cutting tool comprising a mounting shaft including an annular base; a chip breaker positioned on the mounting shaft; a cutting plate supported between the mounting shaft and the chip breaker; a clamping jaw positioned on the chip breaker; a clamping screw releasably held in the mounting shaft; said clamping screw holding the clamping jaw and the chip breaker against the mounting shaft; said clamping screw having a longitudinal axis; and a spring means for urging said chip breaker against said clamping jaw; said spring means having a first portion positioned on said annular base and a second portion normally exerting a force against said chip breaker in the direction of said axis for urging the chip breaker against said clamping jaw; said clamping jaw and said chip breaker having interengaging teeth on surfaces oriented towards one another; said chip breaker having a throughgoing aperture through which said clamping screw passes; and said throughgoing aperture being enlarged to form an elongated opening for permitting lateral movement of said chip breaker transversely to said axis.

2. A cutting tool as defined in claim 1, wherein said clamping screw has an outer portion situated externally of said clamping jaw; and further wherein said chip breaker is, independently from the position thereof relative to said cutting plate, in engagement with said spring means in the vicinity of said outer portion of said clamping screw.

3. A cutting tool as defined in claim 1, wherein said chip breaker further includes a guide pin; and said cutting tool mounting shaft further includes a guide groove for engaging said guide pin.

4. A cutting tool as defined in claim 1, further comprising a chip breaker plate and fastening means for releasably securing said chip breaker plate to said chip breaker.

5. A cutting tool as defined in claim 4, further comprising a recess in a face of the chip breaker; said chip breaker plate being received in said recess; further wherein said fastening means comprises a drive stud.

6. A cutting tool as defined in claim 1, wherein said clamping jaw is plate-shaped.

7. A cutting tool as defined in claim 1, wherein said clamping jaw is positioned exclusively on said chip breaker.

8. A cutting tool as defined in claim 1, wherein said clamping screw further includes an abutment means; and said spring means has a portion thereof positioned on said clamping screw abutment means and another portion thereof which normally exerts a force against said chip breaker in the direction of said axis for urging the chip breaker against said clamping jaw.

9. A cutting tool as defined in claim 1, further wherein said clamping screw has a head and an abutment means adjacent said head for relatively rotatably holding said clamping jaw on said clamping screw between said head and said abutment means.

10. A cutting tool as defined in claim 1, wherein said spring means is a helical spring surrounding said clamping screw.

11. A cutting tool comprising a mounting shaft; a chip breaker positioned on the mounting shaft; a cutting plate supported between the mounting shaft and the chip breaker; a clamping jaw positioned on the chip breaker and including a recess therein; step means situated internally of said chip breaker; a clamping screw releasably held in the mounting shaft; said clamping screw holding the clamping jaw and the chip breaker against the mounting shaft; said clamping screw having a longitudinal axis; and a spring means for urging said chip breaker against said clamping jaw; said spring means having a first portion positioned in said recess and a second portion normally exerting a force against said step means in the direction of said axis for urging the chip breaker against said clamping jaw; said clamping jaw and said chip breaker having interengaging teeth on surfaces oriented towards one another; said chip breaker having a throughgoing aperture through which said clamping screw passes; and said throughgoing aperture being enlarged to form an elongated opening for permitting lateral movement of said chip breaker transversely to said axis.

12. A cutting tool as defined in claim 11, wherein said clamping screw has an outer portion situated externally of said clamping jaw; and further wherein said chip breaker is, independently from the position thereof relative to said cutting plate, in engagement with said spring means in the vicinity of said outer portion of said clamping screw.

13. A cutting tool as defined in claim 11, wherein said clamping jaw is positioned exclusively on said chip breaker.

14. A cutting tool as defined in claim 11, wherein said spring means is a helical spring surrounding said clamping screw.

15. A cutting tool as defined in claim 11, wherein said clamping screw further includes an abutment means; and said spring means has a portion thereof positioned on said clamping screw abutment means and another portion thereof which normally exerts a force against said chip breaker in the direction of said axis for urging the chip breaker against said clamping jaw.

16. A cutting tool as defined in claim 11, further wherein said clamping screw has a head and an abutment means adjacent said head for relatively rotatably holding said clamping jaw on said clamping screw between said head and said abutment means.

17. A cutting tool as defined in claim 11, wherein said chip breaker further includes a guide pin; and said cutting tool mounting shaft further includes a guide groove for engaging said guide pin.

18. A cutting tool as defined in claim 17, further comprising a chip breaker plate and fastening means for releasably securing said chip breaker plate to said chip breaker.

19. A cutting tool as defined in claim 18, further comprising a recess in a face of the chip breaker; said chip breaker plate being received in said recess; further wherein said fastening means comprises a drive stud.

* * * * *